United States Patent Office 3,051,546
Patented Aug. 28, 1962

3,051,546
BORON COMPOUNDS AND THEIR PREPARATION
Henry C. Miller, Wilmington, Del., assignor to E. I. du Pont de Nemours and Company, Wilmington, Del., a corporation of Delaware
No Drawing. Filed Sept. 29, 1959, Ser. No. 843,053
18 Claims. (Cl. 23—14)

This invention relates to a new class of boron compounds, to their preparation, and to their use. More particularly, this invention relates to reaction products of diborane and selected ammonium salts, to a process for their preparation, and to their use in plating processes.

Boron compounds, and particularly boron hydrides, have received a great deal of attention during the past few years as components of high energy fuels. As a result of this activity, boron hydrides are becoming more readily available and new outlets for them are being sought. One such new application involves their use as reducing agents and in this field it is particularly desirable to develop new types of boron compounds having useful reducing properties.

It is an object of this invention to provide a new class of boron compounds and a process for their preparation. A further object is to provide novel boron compounds which are reaction products of diborane and selected ammonium salts and a process for their preparation. A still further object is to provide new boron-containing reducing agents. Another object is to provide new boron-containing reducing agents which are stable toward hydrolysis in aqueous solution. Still another object is to provide novel plating processes employing the new boron-containing reducing agents. Other objects will appear hereinafter.

These and other objects of this invention are accomplished by providing boron compounds of the formula

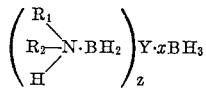

where Y is —SCN, —CN, —OCN, —NO$_3$, —OOCR, —SR, =S, or =SO$_4$, z is the valence of Y, i.e., 1 or 2, R is hydrocarbon of up to 18 carbon atoms, R$_1$ and R$_2$ are hydrogen or hydrocarbon radicals of up to 18 carbon atoms, x is a cardinal or whole number of 0–2, inclusive, i.e., 0, 1 or 2, with the proviso that x is 1 only when Y is —CN or —SR and is 2 only when Y is =S or =SO$_4$.

An especially useful group of the novel products of this invention are those having the above formula in which R is a hydrocarbon radical of up to 10 carbon atoms and R$_1$ and R$_2$ are hydrogen or alkyl or cycloalkyl radicals of up to 10 carbon atoms.

The products of this invention are prepared by introducing diborane into a dry reaction vessel containing a dispersion or solution of a salt of the formula (R$_1$R$_2$HNH)$_z$Y wherein R$_1$, R$_2$, Y and z have the meanings defined previously, in a methyl ether, e.g., ethylene glycol dimethyl ether and diethylene glycol dimethyl ether, or in tetrahydrofuran at a temperature of 0° C. or lower and then allowing the reaction mixture to warm up to room temperature (20–30° C.) gradually. An amount of diborane corresponding to two moles for each mole of salt is absorbed when the salt contains =S or =SO$_4$ anion, one mole for each mole of salt is absorbed when the salt contains a —CN or —SR anion, and 0.5 mole of diborane is absorbed when the salt contains the other anions listed above. It is preferable to use an excess of diborane in order to insure complete reaction. When the stoichiometric amounts of diborane are absorbed in the reaction mixture, the salt is dissolved and a clear solution results.

Any temperature below 0° C. can be used for introducing the diborane into the ether solution of the salt; however, it is preferred to use a temperature above the freezing point of the solvent being employed. Temperatures of —80° C. are very satisfactory with solvents such as ethylene glycol dimethyl ether and tetrahydrofuran.

After the diborane has been absorbed and the reaction mixture is allowed to warm up to a temperature of 0°–5° C., hydrogen begins to be evolved. The reaction mixture is maintained at room temperature until hydrogen evolution ceases. Reaction times ranging from 20 minutes to 2 hours are usually sufficient to obtain complete reaction.

The pressure at which the reaction is carried out is not critical. It is convenient to carry out the reaction by introducing the diborane into a closed reaction vessel containing the solvent and the reactant salt and which has been evacuated and then allowing the reaction to proceed in the closed vessel under the autogenous pressure that develops. However, if desired, the reaction can be carried out at super-atmospheric pressure.

After the reaction is completed, the reaction solvent can be removed from the product salt by evaporation at reduced pressure or by distillation. The resulting salt of formula (R$_1$R$_2$HN·BH$_2$)$_z$Y·$x$BH$_3$ is usually obtained as a viscous liquid. In some cases the salt can be obtained as a solid by dissolving it in a solvent such as diethyl ether or dioxane and precipitating it with a non-solvent such as benzene. In some cases the salts of this invention can be isolated in the form of their etherates. If the ether-free salt is desired, the etherate can be subjected to moderate heating, e.g., 50–75° C., under reduced pressure, e.g., pressures as low as 1 micron of mercury.

It has now been found that new and useful boron compounds are provided by this invention. The boron compounds of this invention are generally soluble in water and alcohols and the resulting solutions are weak acids and are stable to hydrolysis at low pH (i.e., at pH less than 7). However, when the solutions are made basic by the addition of an organic or inorganic base, e.g., sodium hydroxide, ammonia or an amine, the boron compounds evolve hydrogen vigorously.

The diborane and the salts used in the process of this invention can be of the ordinary grades of these materials available commercially or they can be made by known methods. However, it is preferred that the salts be essentially anhydrous because any moisture present in the reaction system will cause liberation of hydrogen.

The invention is illustrated in further detail by the following examples.

EXAMPLE I

Five grams (0.066 mole) of ammonium thiocyanate which has been subjected to a vacuum (<0.01 mm., 25° C.) until dry is covered with 100 ml. of ethylene glycol dimethyl ether distilled directly from lithium aluminum hydride into the reaction vessel. On warming to room temperature, the ammonium thiocyanate is completely soluble in the ethylene glycol dimethyl ether. The solution is recooled by a mixture of solid carbon dioxide and acetone to a temperature of about —80° C. and 0.034 mole of diborane is introduced as a gas over the cold salt solution. The pressure of the reaction mixture in the closed vessel rapidly falls as the diborane is taken up by the ammonium thiocyanate. The reaction mixture is then allowed to warm slowly from —80° C. to room temperature. When the temperature reaches approximately 5° C. hydrogen begins to be evolved. This hydrogen is collected and there is obtained 0.0328 mole, which is approximately half the theoretical amount of hydrogen required for the reaction

The ethylene glycol dimethyl ether reaction medium is removed from the mixture by distillation at 25° C. and less than 50 mm. Hg pressure. The distillate contains no boron. There remains a non-volatile oil which at room temperature loses more hydrogen and turns solid, and which is soluble in diethyl ether and insoluble in petroleum ether. The solid, amounting to 6.1 g., is dissolved in diethyl ether and precipitated with petroleum ether. The resulting precipitate is filtered and dried under vacuum (less than 0.001 mm. at 25° C.). There is obtained 4.0 g. (69% of the theoretical) of white, solid thiocyanatoborane-ammonia. The salt burns vigorously with a green flame and it leaves a white residue. It is soluble in water and in alcohol with the formation of weakly acid solutions which do not evolve hydrogen. No hydrogen is evolved on acidification of the aqueous solution, but vigorous evolution of hydrogen occurs on addition of ammonium or sodium hydroxide. There is no reduction of silver, nickel or ferric ions by the aqueous solution until the pH is increased by the addition of a base which then results in a rapid precipitation of the metals.

*Analysis.*—Calc'd for $CH_5BN_2S$: $H_2$ formed on alkaline hydrolysis, 510 cc./g. C, 13.65%; H, 5.73%; N, 31.8%; S, 36.4%; B, 12.3%. Found: $H_2$ formed on alkaline hydrolysis, 412 cc./g. C, 13.36%; H, 5.29%; N, 30.21%, 30.67%; S, 34.31%; B, 11.82%.

The $B^{11}$ magnetic resonance spectrum of a solution of thiocyanatoborane-ammonia in ethylene glycol dimethyl ether shows only one kind of boron present. The $B^{11}$ resonance is split into a triplet as would be expected for boron bound to two hydrogens. This confirms the structure of the product given above.

The infrared absorption of this salt shows a broad peak in the B—H region ($4.15\mu$), N—H absorption (3.0 to $3.7\mu$ and 6.1 to $6.35\mu$), and thiocyanate absorption (4.6 to $4.7\mu$).

EXAMPLE II

Into about 150 ml. of dried ethylene glycol dimethyl ether cooled to −80° C. is condensed 0.1 mole of dry hydrogen cyanide and 0.1 mole of dry ammonia to obtain at −80° C. a slurry of white crystals of ammonium cyanide. To this slurry is added 0.1 mole of diborane. At −80° C. the diborane is absorbed and all of the solid dissolves. As the clear solution is warmed to room temperature hydrogen evolution sets in at about 0° C. and a total of 0.091 mole of hydrogen is obtained.

The clear reaction mixture at this point is miscible with dioxane, diethyl ether, benzene, chloroform and water but is immiscible with petroleum ether. The clear solutions obtained upon dilution with water are acidic and brisk hydrogen evoelution occurs only when aqueous ammonia or sodium hydroxide is added.

Complete removal of solvent from the reaction mixture by subjection of the mixture to a vacuum of less than 1 micron at room temperature leaves a clear, fluid liquid, which forms clear solutions with dioxane, ether and chloroform (none of which deposits crystals on cooling) but which is not miscible with benzene.

*Analysis.*—Calc'd for $CH_8B_2N_2 \cdot \frac{3}{4} C_4H_{10}O_2$: C, 35.0%; total H, 11.38%; N, 20.4%; B, 15.78%; hydrolyzable H, 3.67%. Found: C, 35.26%; total H, 11.43%; N, 20.58%, 20.65%; B, 15.71%; hydrolyzable H, 3.42%.

The infrared absorption spectrum of this product shows a broad peak at 4.1 to 4.25 microns in the B—H region, a sharp nitrile peak at 4.45 microns and NH absorption as a broad peak at 3.1 microns and a weak peak at 6.2 microns.

The $B^{11}$ resonance shows splitting typical of $B^{11}$—$H^1$ spin-spin coupling. Two kinds of boron are indicated. There is a clearly discernible quadruplet, the high field peak of which is coincident with the low field peak of another more diffuse multiplet (probably a triplet, less likely a quadruplet). Of the two non-equivalent types of boron atoms present, one is in a $BH_3$ group. The other boron is indicated to be in a $BH_2$ group, confirming the formula $H_3N \cdot BH_2CN \cdot BH_3$.

EXAMPLE III

Diborane (1.38 g., 0.05 mole) is introduced into a reaction vessel containing a slurry of 0.1 mole (7.7 g.) of dry ammonium acetate in approximately 200 ml. of ethylene glycol dimethyl ether at −80° C. This diborane is rapidly absorbed. On warming to room temperature there is obtained a clear solution and 0.11 mole of hydrogen. After concentration to approximately one-half its volume, the clear reaction solution is miscible with dioxane, gives two liquid layers with chloroform, and deposits a small amount of a semi-solid when diluted with diethyl ether. It is miscible with water with a slow evolution of hydrogen which becomes brisk only at high pH (i.e., upon addition of aqueous ammonia or sodium hydroxide). Evaporation of the remainder of the solvent from the concentrated solution at 25° C. to a final pressure of less than 1 micron leaves a very viscous, clear liquid. This liquid is immiscible with benzene or with ether but is soluble in dioxane. It is soluble in water without hydrogen evolution and is not hydrolyzed at low pH (i.e., upon addition of mineral acid) but gives hydrogen rapidly when a base, e.g. ammonia or an amine, is added. The liquid adduct of ammonium acetate and diborane ($H_3N \cdot BH_2OOCCH_3$) is washed with dry diethyl ether and then with benzene, and is dried to zero vapor pressure at room temperature.

*Analysis.*—Calc'd for $C_2H_8BNO_2$: C, 27.1%; total H, 9.06%; B, 12.3%; N, 15.75%; hydrolyzable H, 2.26%. Found: C, 27.55%; total H, 7.24%; B, 12.5%; N, 12.73%; hydrolyzable H, 1.55%.

EXAMPLE IV

To a slurry of ammonium benzoate [prepared from 12.4 g. (0.1015 mole) of benzoic acid and 0.102 mole of anhydrous ammonia] in about 200 ml. of ethylene glycol dimethyl ether cooled to −80° C. is added 0.051 mole of diborane. The mixture is warmed to room temperature, whereupon 0.108 mole of hydrogen is given off and the solid dissolves. The solvent is removed from the reaction mixture by distillation at 25° C. under a final pressure of 1 micron of mercury. The viscous, clear residue is soluble in 200 ml. of diethyl ether. The ether is removed from this solution by distillation at room temperature and is replaced by 200 ml. of dry benzene to give a slurry of a semi-solid. Removal of this benzene by room temperature distillation leaves a solid residue which gives an easily filterable slurry in fresh benzene. The solid product, which at this point is of limited solubility in dry diethyl ether, is collected, washed with diethyl ether and dried. This product amounts to 6.3 g. From the filtrate and washings an additional 9.1 g. of product can be isolated. The solid product from ammonium benzoate and diborane is soluble in alcohol, but is insoluble in water. It has the formula $H_3N \cdot BH_2OOCC_6H_5$.

*Analysis.*—Calc'd for $C_7H_{10}BNO_2$: C, 55.8%; H, 6.68%; B, 7.19%; N, 9.28%. Found: C, 56.06%; H, 6.14%; B, 6.24%; N, 7.09%.

The ammonium benzoate/diborane product of Example IV is dissolved in 95% ethanol to form a solution containing 2% of the product and having a pH of approximately 3–4. The addition of aqueous silver nitrate ($AgNO_3$) and mercuric acetate [$Hg(OOCCH_3)_2$] solutions to separate portions of the alcoholic solutions of ammonium benzoate/diborane product results in the immediate formation of black precipitates of the free metals. On the other hand, no reduction is observed when aqueous solutions of nickel chloride ($NiCl_2$), ferric chloride ($FeCl_3$), or lead nitrate [$Pb(NO_3)_2$] are added to the weakly acidic, alcoholic solutions of the product. However, if the product solutions containing the nickel, iron and lead salts are made highly alkaline by addition of aqueous ammonia, black precipitates of the free metals form immediately.

Although metallic nickel is not precipitated from weakly acidic solutions of the ammonium benzoate/diborane product of Example IV, reduced nickel will separate out on the surface of other metals when they are placed in such solutions. Thus, a 0.22 molar aqueous, alcoholic solution of nickel chloride ($NiCl_2$) containing 1.1% by weight of the product of Example IV is heated to about 50° C. There is no precipitation of metallic nickel and only slight evolution of hydrogen. Upon immersion of clean copper strips in the warm solution, a heavy, adherent, shiny coating of nickel forms on the copper strips in 10–15 minutes. Brass, steel and other metals can be plated with nickel in the same manner. Cobalt-plated metal strips can likewise be prepared by immersing metal strips in aqueous alcoholic solutions of the ammonium benzoate/diborane product of Example IV containing cobaltous chloride.

EXAMPLE V

A slurry of 3.8 g. of dry ammonium nitrate in 100 ml. of dry ethylene glycol dimethyl ether is cooled to −80° C. and treated with 0.054 mole of diborane. The diborane is absorbed by the cold mixture which is then allowed to warm to room temperature. The solid dissolves to give a clear solution and hydrogen amounting to 0.052 mole is evolved. The excess diborane is then distilled off under low pressure at room temperature until the reaction mixture has a vapor pressure of about 50 mm. Hg at room temperature (the vapor pressure of ethylene glycol dimethyl ether). The recovered diborane amounts to 0.026 mole.

Thus, 0.0475 mole of ammonium nitrate has interacted with 0.028 mole of diborane (approximately one $BH_3$ per mole of salt) to give 0.052 mole of $H_2$. The stoichiometry of the reaction indicates the following reaction:

$$NH_4NO_3 + \tfrac{1}{2}B_2H_6 \rightarrow H_2 + H_3N \cdot BH_2NO_3$$

After removal of the unused diborane, there remains a clear colorless solution which, when the ethylene glycol dimethyl ether is removed by distillation at room temperature under a high vacuum, leaves a clear colorless oil. The oil is handled carefully at room temperature under an efficient blanket of dry, oxygen-free nitrogen. A fractional gram sample is removed on a swab of cotton and exposed to the atmosphere. After a few seconds it detonates with violence in a flash of green flame. Its shock sensitivity is shown by tapping a fractional gram sample on glass wool with a glass rod whereupon detonation occurs with unusual violence and shatters several inches of the glass rod to small fragments.

EXAMPLE VI $$(CH_3)_2NH_2CN + B_2H_6 \rightarrow (CH_3)_2NH \cdot BH_2CN \cdot BH_3 + H_2$$

Into about 100 ml. of dry ethylene glycol dimethyl ether, cooled to −80° C., is condensed 0.1 mole each of dimethylamine (distilled off calcium hydride) and hydrogen cyanide (distilled off phosphorous pentoxide) to give a slurry of a white solid. To this slurry is added 0.154 mole of diborane. Upon warming the mixture the solid dissolves as diborane is absorbed and then 0.101 mole of hydrogen is evolved. The excess diborane and the glycol dimethyl ether is removed by evaporation under vacuum at room temperature to leave a clear, colorless, fluid oil miscible with benzene and dioxane but insoluble in petroleum ether. The oil is soluble in water (but not completely miscible) to give an acidic solution. Hydrogen is evolved briskly upon the addition of aqueous sodium hydroxide but not upon addition of aqueous hydrochloric acid. $B^{11}$ resonance shows the presence of two kinds of boron, the resonance of which is split by coupling with hydrogen into a triplet in one case and a quadruplet in the other to confirm the structure $$(CH_3)_2NH \cdot BH_2CN \cdot BH_3.$$

Infrared absorption shows the presence of N—H bonds (3.1 and 6.8μ bands), B—H (4.05 and 4.2μ bands), C≡N (4.4μ band) and indicates the essential absence of glycol dimethyl ether since there is no absorption at 3.4μ, a region in which the ether shows strong absorption. Elemental analysis, however, indicates the presence of a trace of solvent which can be removed by prolonged evacuation at room temperature.

*Analysis.*—Calc'd for $C_3H_{12}B_2N_2$: C, 36.85%; H, 12.37%; B, 22.05%; N, 28.75%; hydrolyzable $H_2$, 5.14%. $C_3H_{12}B_2N_2 \cdot 0.075 C_4H_{10}O_2$: C, 37.9%; H, 12.28%; B, 20.65%; N, 26.8%; hydrolyzable $H_2$, 4.78%. Found: C, 37.9%; H, 12.04%; B, 20.48; N, 26.7%; hydrolyzable $H_2$, 4.0%.

EXAMPLE VII $$CH_3NH_3CN + B_2H_6 \rightarrow CH_3NH_2 \cdot BH_2CN \cdot BH_3 + H_2$$

Using the same procedure described in Examples II and VI, diborane is reacted with an equimolar mixture of methylamine and hydrogen cyanide in ethylene glycol dimethyl ether. After the reaction is complete, as indicated by cessation of hydrogen evolution, the ether solvent is evaporated to leave a clear, colorless oil, not volatile at room temperature. The infrared spectrum exhibited by this product is similar to that of the product of Example VI and indicates the product has the formula $$CH_3NH_2 \cdot BH_2CN \cdot BH_3.$$

The infrared spectrum again shows the absence of solvent although in this case too, elemental analysis shows a trace of ether.

*Analysis.*—Calc'd for $C_2H_{10}B_2N_2$: C, 28.7%; H, 12.05%; B, 25.8%; N, 34.4%; hydrolyzable $H_2$, 5.97%. $C_2H_{10}B_2N_2 \cdot \tfrac{1}{8} C_4H_{10}O_2$: C, 28.6%; H, 12.3%; B, 23.85%; N, 30.85%; hydrolyzable $H_2$, 5.5%. Found: C, 28.33%; H, 11.73%; B, 24.13%; N, 31.26%; hydrolyzable $H_2$, 4.6%.

EXAMPLE VIII $$NH_4SCH_3 + B_2H_6 \rightarrow H_3N \cdot BH_2SCH_3 \cdot BH_3 + H_2$$

Into about 100 ml. of ethylene glycol dimethyl ether at −80° C. is condensed 0.1 mole each of methyl mercaptan and ammonia to give a slurry of a white solid. Diborane (0.182 mole) is dissolved in the cold slurry and the mixture is warmed to room temperature. The hydrogen which is evolved is collected and found to be 0.11 mole. When hydrogen evolution ceases, 0.06 mole of excess diborane is recovered from the reaction mixture. Thus, in whole numbers, 1 mole of $NH_4SCH_3$ reacts with 1 mole of $B_2H_6$ to give 1 mole of hydrogen. Evaporation of the solvent from the reaction mixture leaves a non-volatile clear, liquid residue miscible with dioxane but insoluble in benzene and petroleum ether. From the stoichiometry of the reaction, this residue is $H_3N \cdot BH_2SCH_3 \cdot BH_3$.

EXAMPLE IX $$(NH_4)_2S + 2B_2H_6 \rightarrow (H_3N \cdot BH_2)_2S \cdot 2BH_3 + 2H_2$$

Into about 100 ml. of ethylene glycol dimethyl ether is condensed 0.1 mole of ammonia and 0.05 mole of hydrogen sulfide to give a slurry of a white solid to which is added a total of 0.124 mole of diborane. Hydrogen in excess of 0.138 mole is evolved on warming to room temperature and 0.023 mole of unused diborane is recovered. Evaporation of the solvent leaves 6.2 g. of clear, viscous oil which on prolonged exposure to a vacuum at room temperature becomes a friable, white solid. The stoichiometry of the reaction indicates that the solid product is $(H_3N \cdot BH_2)_2S \cdot 2BH_3$ with the evolution of 0.2 mole of hydrogen.

EXAMPLE X $$(NH_4)_2SO_4 + 2B_2H_6 \rightarrow (NH_3 \cdot BH_2)_2SO_4 \cdot 2BH_3 + 2H_2$$

A total of 0.05 mole of diborane is added to a slurry of 6.7 g. (0.055 mole) of dried ammonium sulfate in 100 ml. of ethylene glycol dimethyl ether. During a period of over 2 days there is evolved 0.07 mole of hydrogen. The solid still present is collected, washed and dried and it amounts to 3.6 g. This solid burns with a green flame, gives an acidic aqueous solution which reduces silver ions to metallic silver, and evolves gas on addition of ammonium hydroxide. This is $(NH_3 \cdot BH_2)_2SO_4 \cdot 2BH_3$.

The filtrate from the reaction mixture evolves gas on standing and deposits a solid. Evaporation of the solvent leaves 2.9 g. of a solid which is soluble in water to give a weakly basic solution having a strong sulfide odor.

The examples have illustrated the products and process of this invention by reference to the reaction of certain salts of the formula $(R_1R_2HNH)_zY$ with diborane to form certain adducts of the formula $$(R_1R_2HN \cdot BH_2)_zY \cdot xBH_3$$

wherein $R_1$, $R_2$, $Y$, $x$ and $z$ have the meanings heretofore given. However, the products of this invention also include the products listed in the second column of the following Table I which are obtained according to the process of this invention by reaction of diborane with the salts listed in the first column of the table.

*Table I*

| Reactant | Product |
|---|---|
| $NH_4OCN$ | $H_3N \cdot BH_2OCN$ |
| $NH_4SC_2H_5$ | $H_3N \cdot BH_2SC_2H_5BH_3$ |
| $NH_4SC_{10}H_{21}$ | $H_3N \cdot BH_2SC_{10}H_{21} \cdot BH_3$ |
| $NH_4OOCC_8H_{17}$ | $H_3N \cdot BH_2OOCC_8H_{17}$ |
| $NH_4OOCC_4H_9$ | $H_3N \cdot BH_2OOCC_4H_9$ |
| $NH_4OOCC_2H_5$ | $H_3N \cdot BH_2OOCC_2H_5$ |
| $NH_4OOCC_{17}H_{35}$ | $H_3N \cdot BH_2OOCC_{17}H_{35}$ |
| $(C_3H_7)_2NH_2OCN$ | $(C_3H_7)_2NH \cdot BH_2OCN$ |
| $C_4H_9NH_3CN$ | $C_4H_9NH_2 \cdot BH_2CN \cdot BH_3$ |
| $(C_2H_5)_2NH_2OOCCH_3$ | $(C_2H_5)_2NH \cdot BH_2OOCCH_3$ |
| $C_2H_5NH_3OOCC_6H_5$ | $C_2H_5NH_2 \cdot BH_2OOCC_6H_5$ |
| $C_6H_{11}NH_3SCH_3$ | $C_6H_{11}NH_2 \cdot BH_2SCH_3 \cdot BH_3$ |
| $C_{18}H_{37}NH_3SCN$ | $C_{18}H_{37}NH_2 \cdot BH_2SCN$ |
| $(C_{10}H_{21})_2NH_2OOCC_2H_5$ | $(C_{10}H_{21})_2NH \cdot BH_2OOCC_2H_5$ |
| $(C_2H_5)_2NH_2CN$ | $(C_2H_5)_2NH \cdot BH_2CN \cdot BH_3$ |
| $[(CH_3)_2NH_2]_2S$ | $[(CH_3)_2NH \cdot BH_2]_2S \cdot 2BH_3$ |
| $[(C_2H_5)_2NH_2]_2SO_4$ | $[(C_2H_5)_2NH \cdot BH_2]_2SO_4 \cdot 2BH_3$ |

The above table illustrates reactants and products of this invention having the respective formulas $$(R_1R_2HNH)_zY$$

and $(R_1R_2HN \cdot BH_2)_zY \cdot xBH_3$, where Y of valence z is =S, =SO_4, —SCN, —OCN, —SR, —CN and —OOCR, and where R is a hydrocarbon radical of not more than 18 carbon atoms, and $R_1$ and $R_2$ are hydrogen or hydrocarbon radicals of not more than 18 carbon atoms. It is preferred that R be a hydrocarbon radical of not more than 10 carbon atoms, such as alkyl, aryl and cycloalkyl radicals having 1–10 carbon atoms, and that $R_1$ and $R_2$ be hydrogen, alkyl or cycloalkyl radicals of 1–10 carbon atoms.

The products of this invention are particularly useful as reducing agents, and particularly in the plating of metals. They are particularly useful in such applications because of their stability in aqueous solution (even acidic aqueous solutions) and because of their selectivity (which is dependent on pH) in reducing metal ions. Their most unique property is their stability toward hydrolysis in aqueous solution at low pH. Addition of aqueous mineral acid, e.g., hydrochloric or sulfuric acid, to an aqueous solution of any previously known boron hydride derivative (of which $(CH_3)_3NBH_3$, $(CH_3)_2NHBH_3$, $NaBH_4$, and $NaB_3H_8$ can be cited as typical examples) results in an immediate and vigorous evolution of hydrogen. In contrast, aqueous mineral acid can be added to an aqueous solution of the products of this invention (for example, $H_3N \cdot BH_2SCN$) with little or no hydrogen evolution. Hydrogen is quickly and rapidly evolved from these products upon addition of aqueous sodium or ammonium hydroxide, reagents to which all previously known boron hydride derivatives (as illustrated above) are unreactive.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A boron compound of the general formula $$(R_1R_2HN \cdot BH_2)_zY \cdot xBH_3$$

where Y is selected from the group consisting of —SCN, —CN, OCN, —NO_3, —OOCR, —SR, =S, and =SO_4, R is a hydrocarbon radical of not more than 18 carbon atoms, $R_1$ and $R_2$ are selected from the group consisting of hydrogen and hydrocarbon radicals of not more than 18 carbon atoms, z is the valence of Y, and x is a cardinal number of 0 to 2 inclusive, with the proviso that x is 1 only when Y is selected from the group consisting of —CN and —SR, and is 2 only when Y is selected from the group consisting of =S and =SO_4.

2. A boron compound having the general formula $$R_1R_2HN \cdot BH_2OOCR$$

where R, $R_1$ and $R_2$ are hydrocarbon radicals of not more than 18 carbon atoms.

3. A boron compound having the general formula $$R_1R_2HN \cdot BH_2OOCR$$

where R, $R_1$ and $R_2$ are alkyl radicals of not more than 10 carbon atoms.

4. A boron compound having the general formula $$R_1R_2HN \cdot BH_2CN \cdot BH_3$$

where $R_1$ and $R_2$ are hydrocarbon radicals of not more than 18 carbon atoms.

5. The boron compound having the formula $$H_3N \cdot BH_2SCN$$

6. The boron compound having the formula $$H_3N \cdot BH_2CN \cdot BH_3$$

7. A boron compound having the general formula $$H_3N \cdot BH_2OOCR$$

where R is a hydrocarbon radical of not more than 18 carbon atoms.

8. A boron compound having the general formula $$H_3N \cdot BH_2SR \cdot BH_3$$

where R is a hydrocarbon radical of not more than 18 carbon atoms.

9. The boron compound having the formula $$H_3N \cdot BH_2NO_3$$

10. Process of preparing a boron compound which comprises introducing diborane into a liquid reaction medium selected from the group consisting of a methyl ether and tetrahydrofuran at a temperature of not more than 0° C., said liquid reaction medium containing a salt of the formula $$(R_1R_2HNH)_zY$$

where Y is selected from the group consisting of —SCN, —CN, —OCN, —NO_3, —OOCR, —SR, =S, and =SO_4, z is the valence of Y, R is a hydrocarbon radical of not more than 18 carbon atoms, and $R_1$ and $R_2$ are selected from the group consisting of hydrogen and hydrocarbon radicals of not more than 18 carbon atoms, then warming the reaction mixture to room temperature of 20 to 30° C.

11. Process of preparing a boron compound which comprises introducing diborane into a liquid reaction medium selected from the group consisting of a methyl ether and tetrahydrofuran at a temperature of not more than 0° C., said liquid reaction medium containing a salt of the formula $$R_1R_2HNHOOCR$$

where R, R₁ and R₂ are hydrocarbon radicals of not more than 18 carbon atoms, then warming the reaction mixture to room temperature of 20 to 30° C.

12. Process of preparing a boron compound which comprises introducing diborane into a liquid reaction medium selected from the group consisting of a methyl ether and tetrahydrofuran at a temperature of not more than 0° C., said liquid reaction medium containing a salt of the formula

R₁R₂HNHOOCR where R, R₁ and R₂ are alkyl radicals of not more than 10 carbon atoms, then warming the reaction mixture to room temperature of 20 to 30° C.

13. Process of preparing a boron compound which comprises introducing diborane into a liquid reaction medium selected from the group consisting of a methyl ether and tetrahydrofuran at a temperature of not more than 0° C., said reaction medium containing a salt of the formula

R₁R₂HNHCN where R₁ and R₂ are hydrocarbon radicals of not more than 18 carbon atoms, then warming the reaction mixture to room temperature of 20 to 30° C.

14. Process of preparing a boron compound having the formula H₃N·BH₂SCN which comprises introducing diborane into a liquid reaction medium selected from the group consisting of a methyl ether and tetrahydrofuran at a temperature of not more than 0° C., said liquid reaction medium containing ammonium thiocyanate, then warming the reaction mixture to room temperature of 20 to 30° C.

15. Process of preparing a boron compound having the formula H₃N·BH₂CN·BH₃ which comprises introducing diborane into a liquid reaction medium selected from the group consisting of a methyl ether and tetrahydrofuran at a temperature of not more than 0° C., said liquid reaction medium containing ammonium cyanide, then warming the reaction mixture to room temperature of 20 to 30° C.

16. Process of preparing a boron compound which comprises introducing diborane into a liquid reaction medium selected from the group consisting of a methyl ether and tetrahydrofuran at a temperature of not more than 0° C., said liquid reaction medium containing a salt of the formula

H₄NOOCR where R is a hydrocarbon radical of not more than 18 carbon atoms, then warming the reaction mixture to room temperature of 20 to 30° C.

17. Process of preparing a boron compound which comprises introducing diborane into a liquid reaction medium selected from the group consisting of a methyl ether and tetrahydrofuran at a temperature of not more than 0° C., said liquid reaction medium containing a salt of the formula

H₄NSR where R is a hydrocarbon radical of not more than 18 carbon atoms, then warming the reaction mixture to room temperature of 20 to 30° C.

18. Process of preparing a boron compound having the formula H₃N·BH₂NO₃ which comprises introducing diborane into a liquid reaction medium selected from the group consisting of a methyl ether and tetrahydrofuran at a temperature of not more than 0° C., said liquid reaction medium containing ammonium nitrate, then warming the reaction mixture to room temperature of 20 to 30° C.

References Cited in the file of this patent

UNITED STATES PATENTS

| | | |
|---|---|---|
| 2,461,661 | Schlesinger | Feb. 15, 1949 |
| 2,726,170 | Warf | Dec. 6, 1955 |
| 2,842,461 | Wagner et al. | July 8, 1958 |
| 2,874,072 | Cahill et al. | Feb. 17, 1959 |
| 2,921,963 | Baker et al. | Jan. 19, 1960 |
| 2,925,441 | Brown | Feb. 16, 1960 |
| 2,992,885 | Jackson et al. | July 18, 1961 |

OTHER REFERENCES

Hard: Chemistry of the Hydrides (1952), John Wiley & Sons, page 84.